US007634871B2

(12) United States Patent
DiPaolo et al.

(10) Patent No.: US 7,634,871 B2
(45) Date of Patent: Dec. 22, 2009

(54) GROWING CONTAINER AND APPARATUS

(75) Inventors: Frank DiPaolo, Scranton, PA (US); Matthew Markefka, Richboro, PA (US); Clifford Fay, Harveys Lake, PA (US)

(73) Assignee: Laminations, Inc., Archbald, PA (US)

( * ) Notice: Subject to any disclaimer, the term of this patent is extended or adjusted under 35 U.S.C. 154(b) by 0 days.

(21) Appl. No.: 11/964,346

(22) Filed: Dec. 26, 2007 (Under 37 CFR 1.47)

(65) Prior Publication Data

US 2008/0250712 A1 Oct. 16, 2008

Related U.S. Application Data

(63) Continuation of application No. 11/741,309, filed on Apr. 27, 2007, now abandoned.

(60) Provisional application No. 60/796,201, filed on May 1, 2006, provisional application No. 60/796,147, filed on May 1, 2006.

(51) Int. Cl.
*A01G 25/00* (2006.01)

(52) U.S. Cl. ........................................... 47/66.2; 47/79

(58) Field of Classification Search ..................... 47/79, 47/81, 66.2, 73, 59 R, 63, 60, 64, 65.5, 66.1, 47/66.5, 68, 69, 75, 80; 248/678, 687, 346.01, 248/220.21; 211/88.03, 85.23, 134, 189, 211/126.11, 126.12, 133.1; 119/166; 209/373, 209/374; 220/501, 630
See application file for complete search history.

(56) References Cited

U.S. PATENT DOCUMENTS

| | | | | |
|---|---|---|---|---|
| 2,081,337 | A * | 5/1937 | Lockyer | 47/81 |
| 3,065,860 | A * | 11/1962 | Swanson | 211/153 |
| 4,276,720 | A * | 7/1981 | Lyon | 47/39 |
| 4,790,105 | A * | 12/1988 | Wareing et al. | 47/84 |
| 5,524,387 | A * | 6/1996 | Whisenant | 47/79 |
| 5,638,638 | A * | 6/1997 | Moskowitz | 47/71 |
| 6,385,899 | B1 * | 5/2002 | Treganza | 47/39 |

* cited by examiner

*Primary Examiner*—Michael R Mansen
*Assistant Examiner*—Michael Kreiner
(74) *Attorney, Agent, or Firm*—William E. Jackson; Douglas E. Jackson; Stites & Harbison PLLC

(57) ABSTRACT

A growing apparatus in which a plant is grown includes a container having a bottom and a surrounding wall member attached to the bottom, and a perforated partition located in the container above the bottom. The container further includes a plurality of holders extending upwardly from the bottom and attached to the surrounding wall. Each holder includes a first portion which vertically engages the perforated partition to hold the partition a predetermined distance above the bottom, and a second portion which horizontally engages the perforated partition to hold the surrounding wall member adjacent the partition. The perforated partition further includes a planar base and a skirt depending from the base, whereby the skirt is engaged by the first portion and the second portion of the container.

20 Claims, 9 Drawing Sheets

GROWING CONTAINER AND APPARATUS

CROSS REFERENCE TO RELATED APPLICATIONS

This application is a continuation of U.S. application Ser. No. 11/741,309, filed Apr. 27, 2007, now abandoned; which claims benefit of U.S. Provisional Application No. 60/796,201 filed May 1, 2006, and of U.S. Provisional Application No. 60/796,147, filed May 1, 2006; all of which are hereby incorporated by reference.

BACKGROUND OF THE INVENTION

The present invention is related to improvements in the construction of an existing commercially available product known as a self-watering planter sold under the trademark Earthbox® (U.S. Reg. No. 1,906,561), or the like. The Earthbox® self-watering planter container is the subject of several U.S. patents granted to Blake Whisenant—see U.S. Pat. Nos. 5,103,584; 5,193,306; 5,379,547; 5,524,387; 5,555,675, which are incorporated herein by reference.

The Earthbox® container typically includes a planting container, a perforated partition spaced from the bottom of the container, and a water overflow means to keep the water level at a maximum below the perforated container when in use, among other elements.

BRIEF SUMMARY OF THE INVENTION

In accordance with the present invention, a growing apparatus in which a plant is grown includes a container having a bottom and a surrounding wall member attached to the bottom, and a perforated partition located in the container above the bottom. The container is preferably rectangular further includes a plurality of holders extending upwardly from the bottom and attached to the surrounding wall. Each holder includes a first portion which vertically engages the perforated partition to hold the partition a predetermined distance above the bottom, and a second portion which horizontally engages the perforated partition to hold the surrounding wall member adjacent the partition. The perforated partition is likewise preferably rectangular and further includes a planar base and a skirt depending from the base, whereby the skirt is engaged by the first portion and by the second portion of the container.

In a preferred embodiment, the perforated partition includes a series of reinforcing bosses extending between the skirt and the planar base. These reinforcing bosses strengthen the perforated partition vertically as well as horizontally. In addition, the perforated partition includes a reinforcing rib extending between opposed sides of the skirt. This reinforcing rib strengthens the perforated partition vertically as well as horizontally. More preferably, the perforated partition includes at least two of the reinforcing ribs which meet at an intersection; and then the container includes a support upstanding from the bottom which engages the reinforcing ribs at the intersection to vertically support the perforated partition at the intersection.

In one embodiment, the bottom of the container includes a plurality of spaced pin receiving holes in which respective pins of respective caster wheels can be mounted to extend exteriorly from the bottom.

Also in one embodiment, each holder is formed as an upstanding member. This upstanding member is connected at a bottom end to the planar base of the bottom, and connected at a side to the adjacent surrounding wall member. In addition, this upstanding member is unconnected at a top free end, such that a top of the upstanding member below the free end forms the first portion which vertically supports the skirt and a side of the free end forms the second portion which horizontally engages the skirt.

Further in one embodiment, the container includes a pair of opposing indentations located at intersections of the bottom and the surrounding wall, as in centrally along opposed longitudinal walls. Then, one of the indentations includes an upper horizontal surface with an overflow opening provided therein.

Still further in one embodiment, the partition includes a horizontal cut-out along a side thereof, as in a corner. Then, the container includes a dam structure located below the cut-out. This dam structure, together with the surrounding wall member, horizontally encloses the bottom of the container located below the cut-out. However, the dam structure includes openings therein to permit water to flow through the dam structure.

It is an advantage of the present invention that a sturdy and easily used growing apparatus is provided in which plants can be easily grown.

It is also an advantage of the present invention that the integrity of the container and the location of the partition are maintained during use.

Other features and advantages of the present invention are stated in or apparent from detailed descriptions of presently preferred embodiments of the invention found hereinbelow.

DETAILED DESCRIPTION OF THE INVENTION

Figures 1, 2:
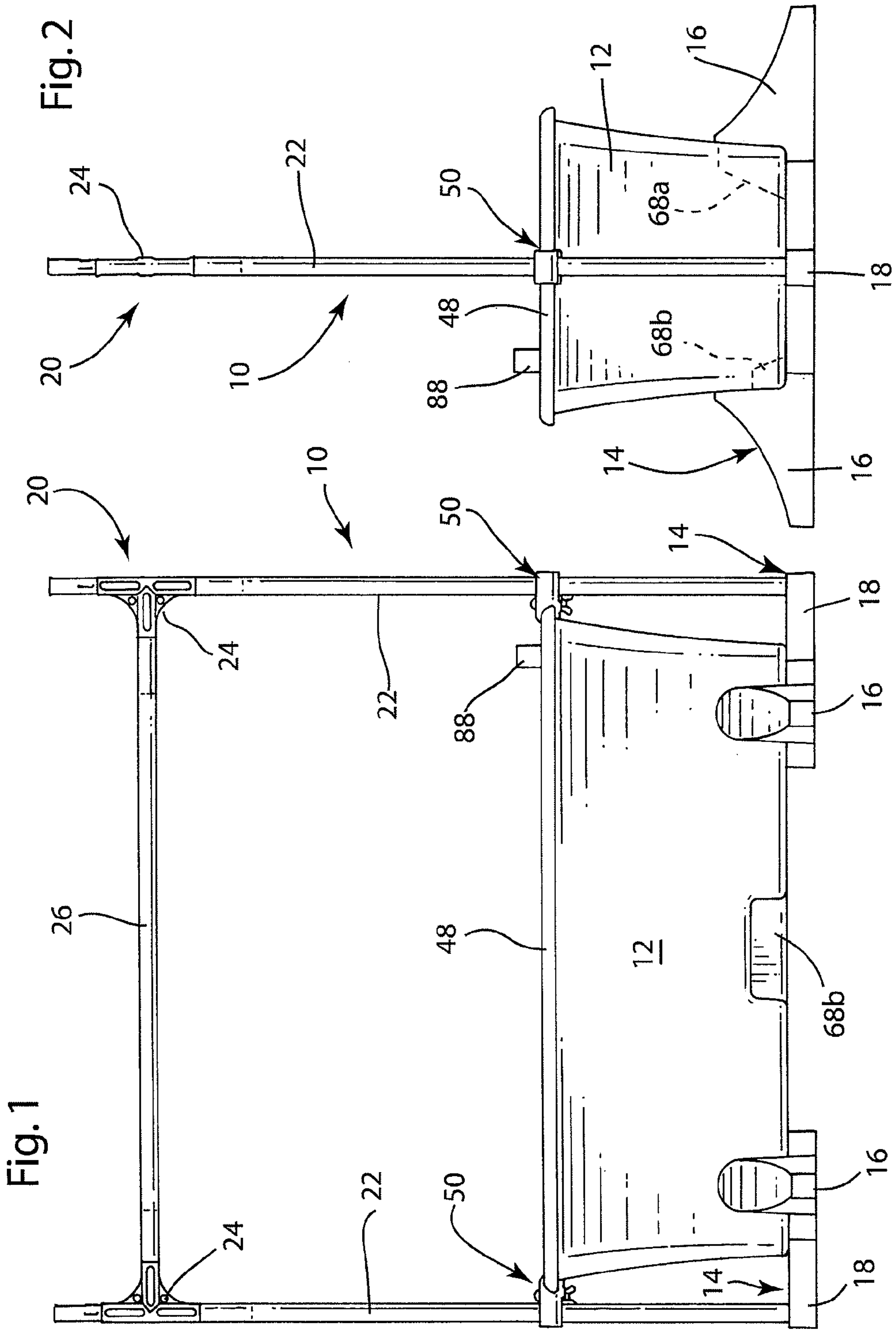
FIG. 1 is a side elevation view of an apparatus including a growing container with a staking system attached according to the present invention.
FIG. 2 is an end elevation view of the apparatus depicted in FIG. 1.

With reference now to the drawings in which like numerals represent like elements, FIGS. 1 and 2 depict a growing apparatus 10 in accordance with the present invention. Growing apparatus 10 includes an Earthbox® type container 12, which is depicted as a truncated rectangular structure and which has been formed by an integral blow molding or the like. As shown in the Whisenant patents noted above, container 12 holds, above a partition beneath which a reservoir is formed, a growing medium and fertilizer for growing plants such as tomato plants, green peppers, etc.

At the outer lower ends container 12 there is a staking system 20 which includes a pair of outriggers 14. As best seen in FIGS. 1-2 and 4-6, each outrigger 14 is configured to have lateral feet 16 that extend outward from the side of the container 12 and a longitudinal foot 18 that extends outward from the end along the longitudinal axis of the container 12. The purpose of the outriggers 14 are to provide additional stability to the planted container 12; and additionally to provide a support function for a remainder of staking system 20 which includes two vertical stakes 22, two connectors 24 and a horizontal interconnecting stable bar or element 26 as depicted in FIGS. 1 and 2. As shown, the bottom of vertical stake 22 is received in and extends upwards from a hole 28 having a closed bottom end which is provided in the free end of each respective longitudinal foot 18.

Figure 3:
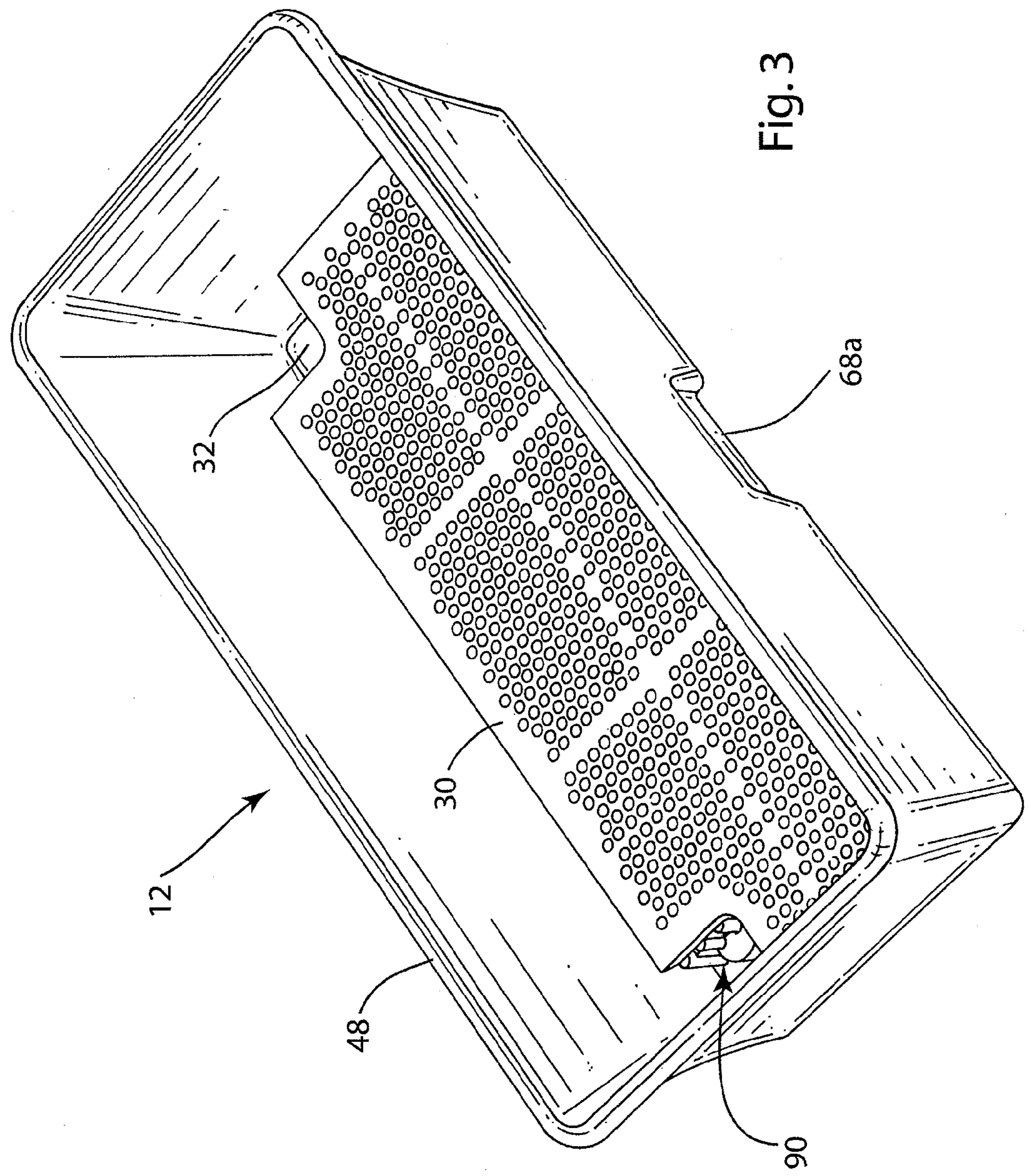
FIG. 3 is an isometric top, end and side view showing the interior of the growing container depicted in FIG. 1 without the growing medium plants, etc.; and in particular it depicts the outer growing container with the perforated partition spaced vertically from the bottom of the container.

FIG. 3 depicts the arrangement of the perforated partition 30 within the lower portion of the container 12. As depicted, the opposite ends of the partition have cut-outs 32. When growing apparatus 10 is assembled, the growing medium (not shown) is placed on top of partition 30 and additionally in the cut-outs 30 at the corners of the container 12 down to the bottom of container 12. Thus, the growing medium in the cut-outs 32 provide a wicking function for water, located in the lower reservoir portion 82 of the container 12 below the perforated partition 30, to the growing medium located above partition 30 and mostly otherwise filling container 12.

Figure 4:
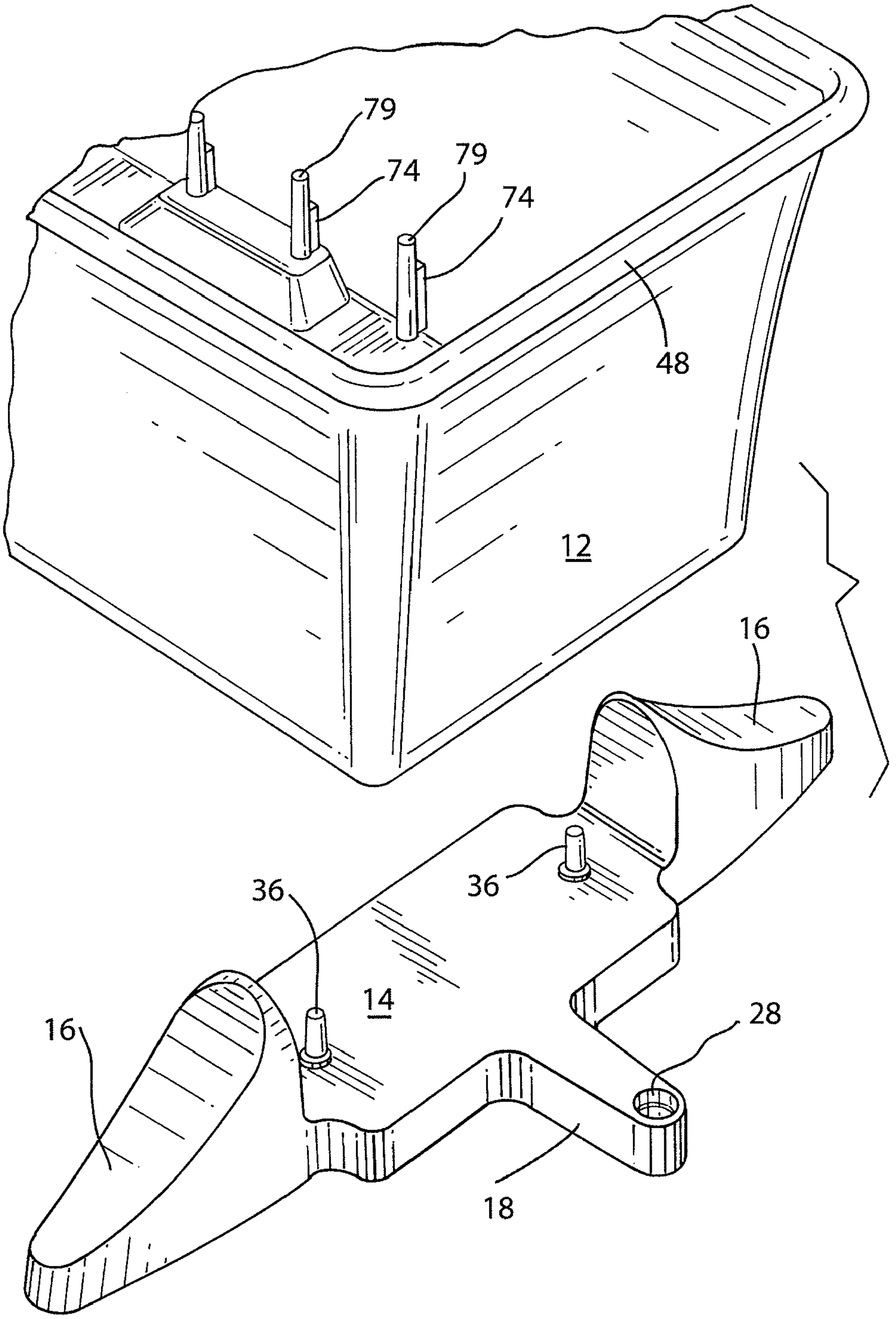
FIG. 4 is an isometric top, end and side exploded view of a portion of the container and one outrigger as depicted in FIG. 1.

As seen in FIG. 4, each outrigger 14 is provided with vertically oriented pins 36 that engage with and into the bottom of the container 12. As further depicted in the exploded view of FIG. 5, spaced pin receiving holes 38 which are closed (see FIG. 10) are integrally moulded in the horizontal base of the container 12 to receive respective pins 36. When viewed from above as in FIG. 10, closed holes 38 appear as an upstanding cylinder 38' as shown in the one corner, which cylinder 38' in this case is also formed with other elements as discussed below. Also, as depicted most clearly in FIG. 5, the lateral feet 16 of each outrigger 14 have bushings or defined holes 40 into which the vertical pins of respective casters or other wheels 42 may be inserted to provide mobility for moving a planted growing apparatus 10 around. Such ease of mobility is an advantage in that the entire growing apparatus 10 can be moved from one place to another as desired such as might be desired due to weather changes, the position of the sun during the afternoon, etc. Furthermore, the use of caster wheels 42 makes it much more easier to move the container 12 when completely planted because the container 12 when planted contains water and growing medium of substantial weight. If desired, a caster pin hole can also be provided at the end of longitudinal foot 18 extending up through closed hole 28 as well to add two additional castor wheels to additionally help support the weight and/or mobility of growing apparatus 10. Alternatively, the pins of the caster wheels can be inserted directly in closed holes 38 when staking system 20 is not used or not currently being used.

As also depicted in FIGS. 1 and 2, vertical stakes 22 are reinforced or held securely at the level of the rim 48 of the container 12 through the use of a rim clamp 50. As depicted in the exploded view in FIG. 6, the rim clamp 50 includes an upper clamp element 52 and a bottom clamp element 54 which inter-engage. When inter-engaged, both elements 52, 54 define aligned holes 56 and 58 through which the vertical stake is inserted during assembly of the staking system 20. As depicted in FIGS. 1 and 2, when completely assembled, upper rim clamp 52 and bottom rim clamp 54 are engaged and held tightly together by means of a carriage bolt 60 and a wing nut 62 passing therethrough in respective holes 64 and 66—both of which have a square end as depicted for hole 64 so bolt 60 can be inserted into either element 52 or 54. Clamp elements 52 and 54 are obviously secured over and under the overturned rim 48 of container 12 so that when wing nut 62 is tightened rim clamp 50 is thus rigidly attached to container 12.

Figure 5:
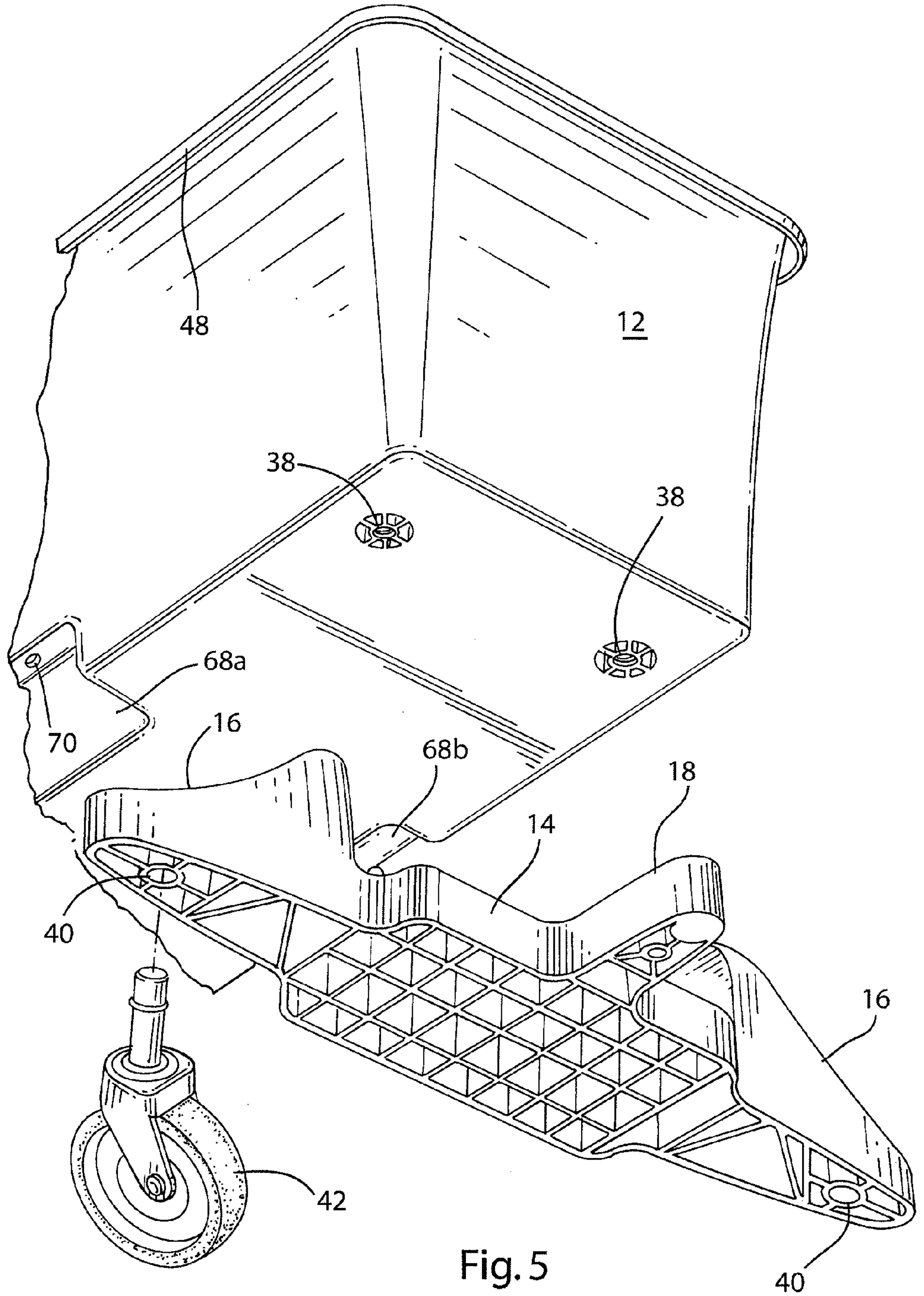
FIG. 5 is an isometric bottom, side and end exploded view of the container and outrigger as depicted in FIG. 4.
Figure 6:
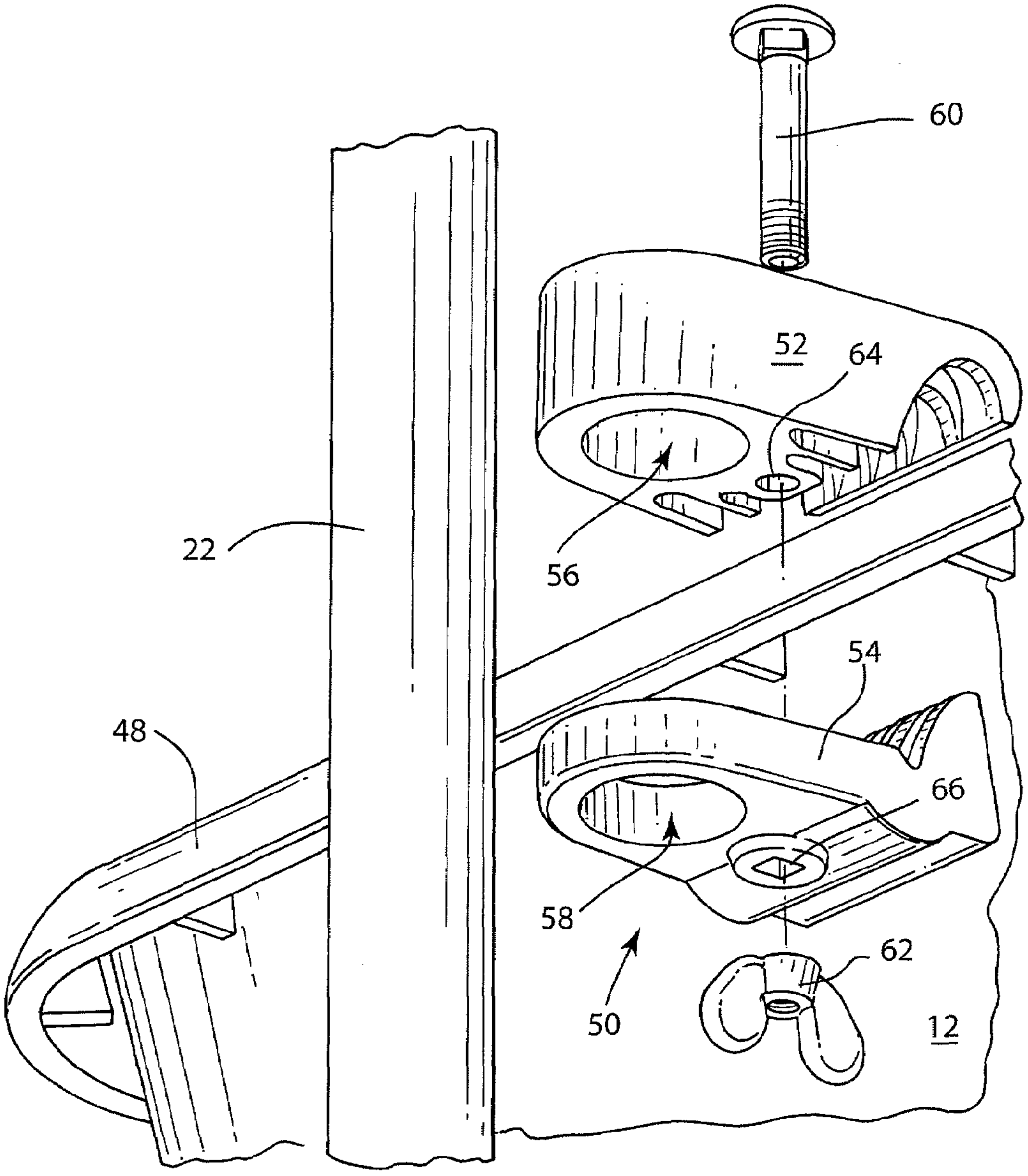
FIG. 6 is an exploded and enlarged isometric bottom, end and side view depicting a rim clamp and a portion of a vertical stake used for attachment to the rim of the container.

FIG. 5 also depicts the arrangement of the bottom portion of the container 12 which utilizes concave indentations **68*a* and 68*b* at the longitudinal center of each intersection of the side and bottom. In horizontally larger (as shown best in phantom in FIG. 2) indentation 68*a*, a water overflow opening 70 is formed. Overflow opening 70 is simply a vertical hole and is used for easy water drainage whenever the height of water in container 12 is temporarily above opening 70 as sometime occurs when the reservoir 82 (discussed below) is overfilled inadvertently (or purposefully, to bring the water level up to its maximum desired height). Opening 70 is resistant to blockage, as anything tending to block the opening 70 which is smaller than opening 70 is pulled by gravity through opening 70. It will also be noted that the other, smaller concave indentation 68*b*** is provided for aesthetics and symmetry.

Figure 7:
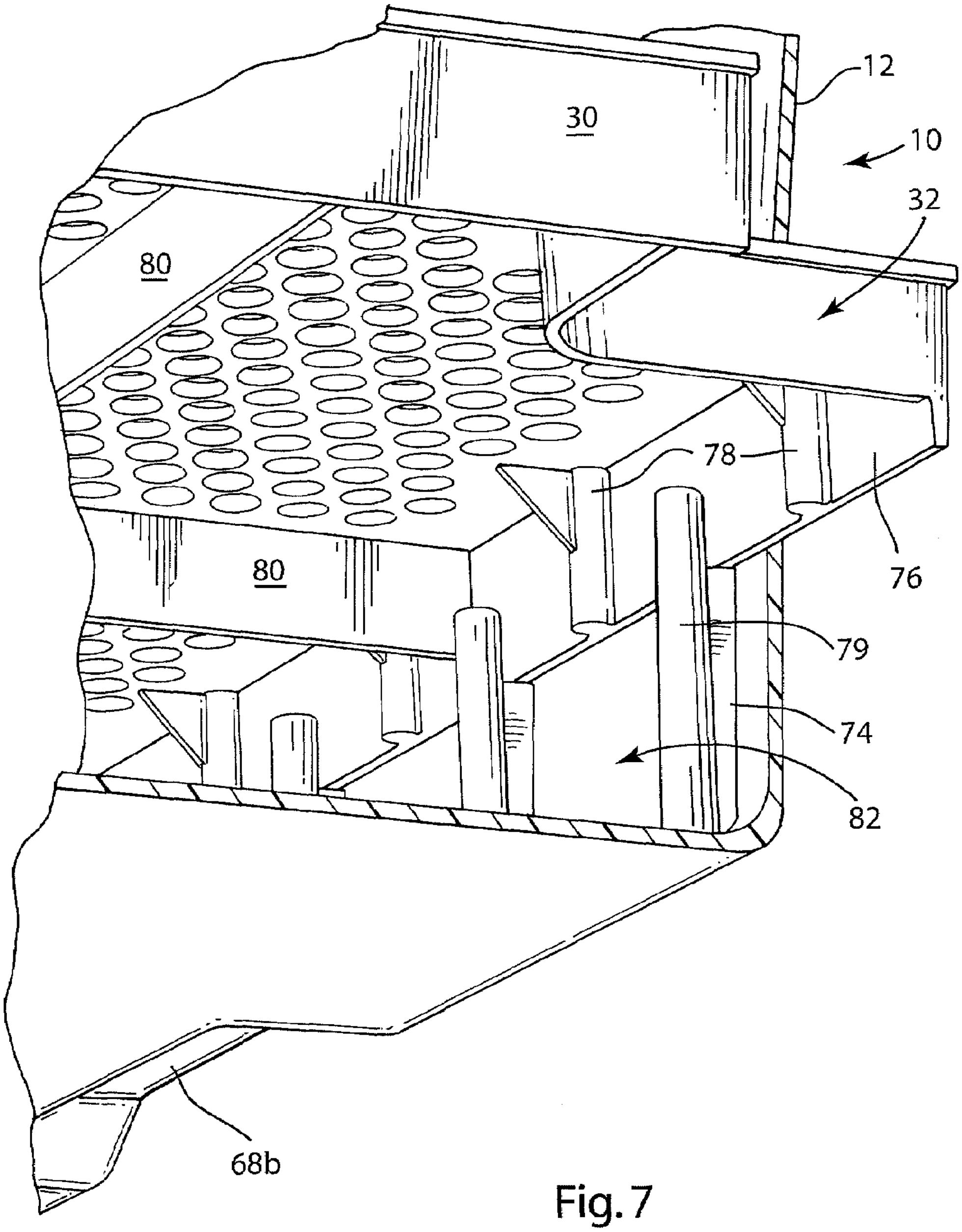
FIG. 7 is an enlarged isometric bottom, side and end view with portions cut away depicting the inter-engagement means between the perforated partition and the inside of the bottom and sides of the container.

FIG. 7 shows a partial cut-away view of the longitudinal corner of the perforated partition 30 engaging the lower interior portion of the container 12. FIG. 7 also shows that integral, vertically gusseted bosses or holders 74 are located somewhat spaced from the outer wall of the container 12 so as to provide an inter-engagement means for partition 30. In particular, this engagement means is in the form of a free end 79 for the depending skirt 76 formed around the outer periphery of the perforated partition 30. Also the perforated partition 30 has integral strengthening gusseted bosses 78 as well as integral webs or ribs 80 running across and lengthwise along the bottom of the perforated partition 30. Bosses 78 and ribs 80 provide strength so that the perforated partition can support the vertical weight of a growing medium and plants and other items which are utilized to grow plants. Bosses 78 and ribs 80 also provide horizontal strength so that when skirt 76 is trapped behind free end 79 of holders 74 of container 12, the sidewalls of container 12 will not bow out under the pressure/weight of the growing medium and water contained in container 12 during use. It will be appreciated that the area in FIG. 7 located below the perforated partition 30 and above the horizontal bottom of the growing container 12 is the water reservoir 82 where water is held during use, but only up to a certain maximum level depending upon the vertical location of the water overflow opening 70 as shown in FIG. 5 and discussed above.

Figure 8:
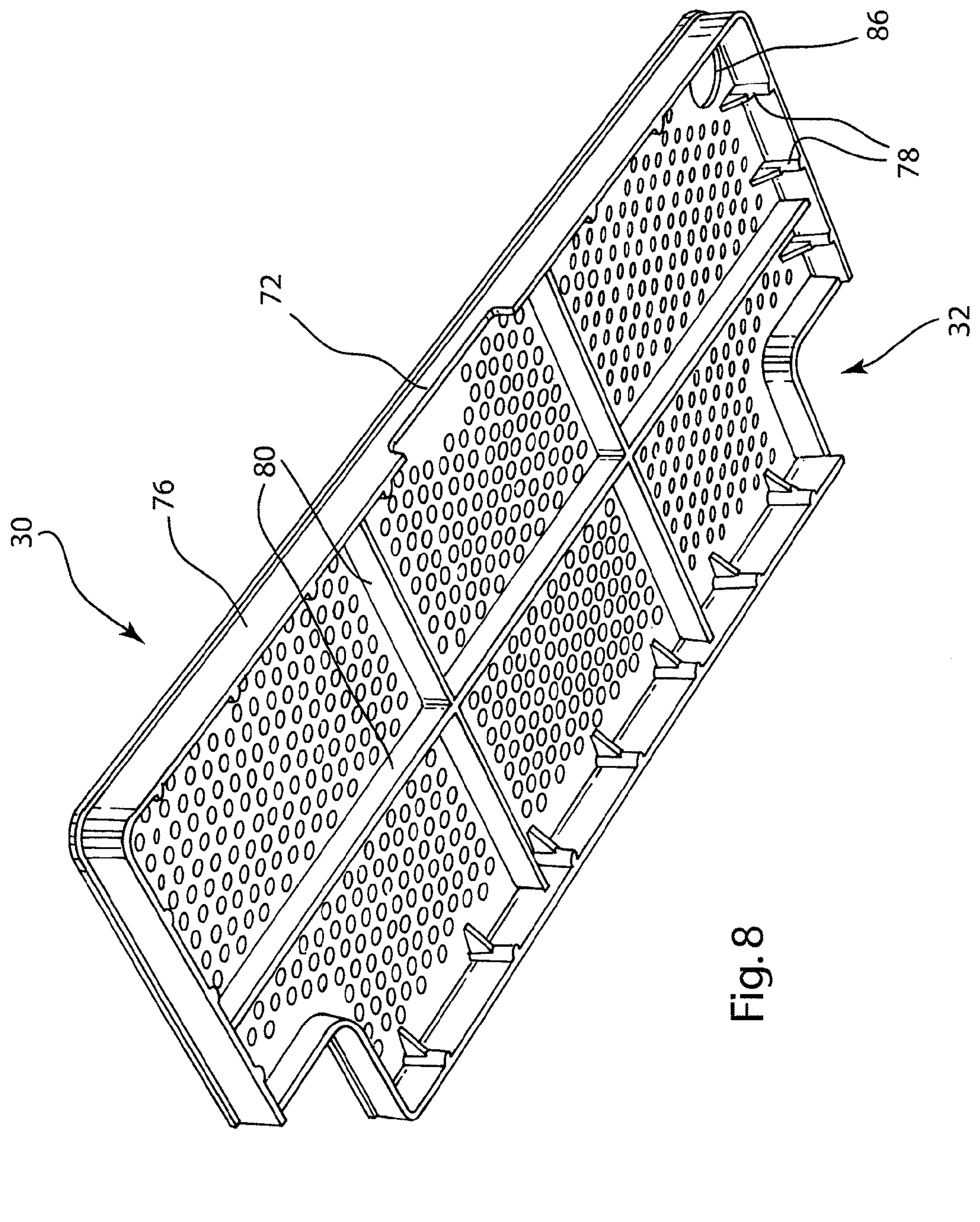
FIG. 8 is an isometric bottom, end and side view of the perforated partition depicting the strengthening webs and gussets molded into the partition.

FIG. 8 is an isomeric view of the bottom of the perforated partition 30 showing its outer skirt 76 as well as the sideways and lengthways support webs or ribs 80 in addition to integral gusseted bosses 78 which are arranged around the inner and lower periphery of the perforated partition 30. Also depicted are the cut-out corners 32 as well as a hole 86 in the most right hand corner of FIG. 8 for allowing a water filler pipe 88 to be inserted through the partition 30 into the lower water reservoir 82 of an assembled container 12.

Figure 9:
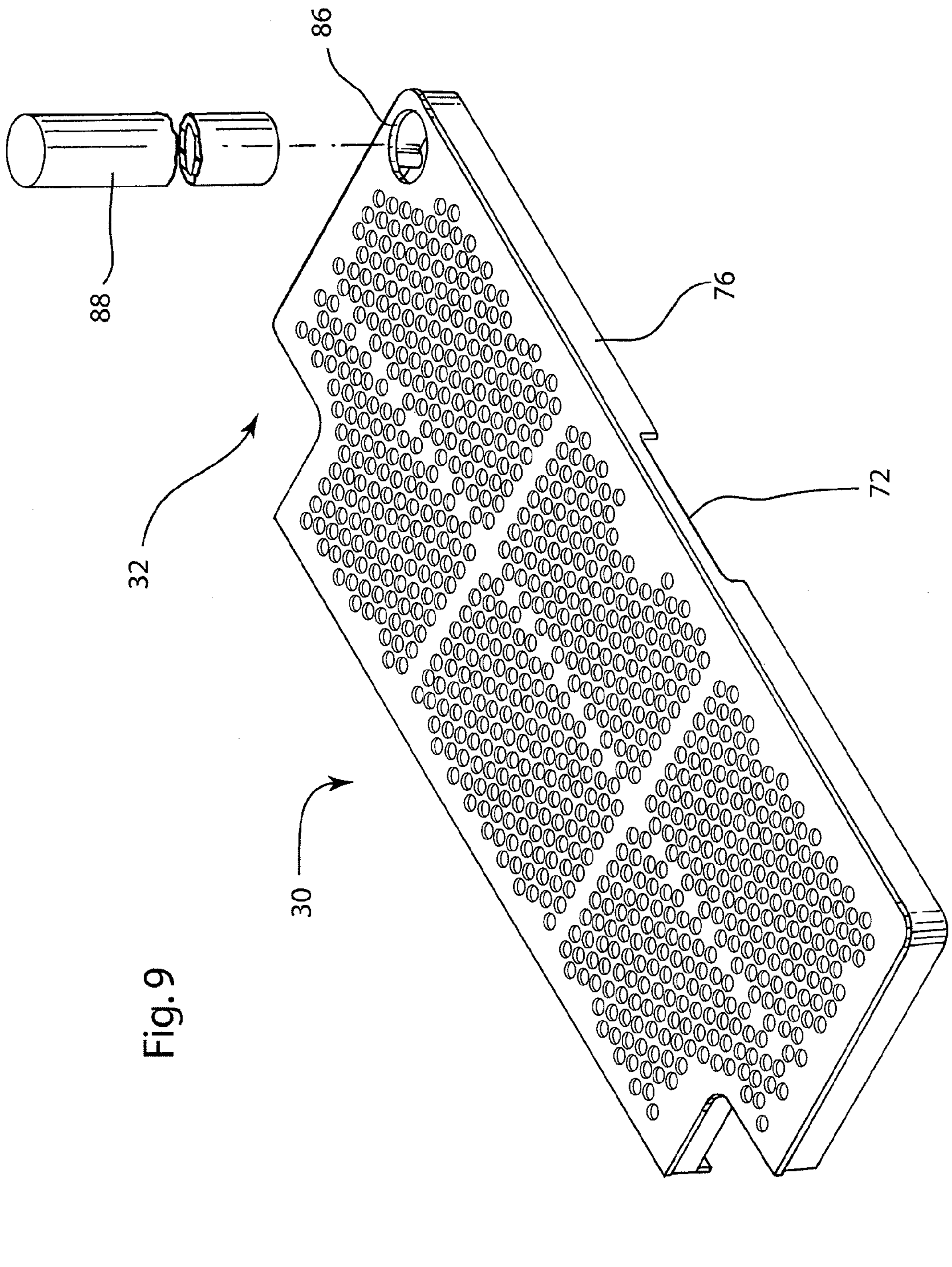
FIG. 9 is an isometric top, end and side view of the perforated partition of FIG. 8.

FIG. 9 is an isometric view depicting the top of the perforated partition 30 and showing the circular hole 86 in the corner and the cut-out corners 32 provided in at least one corner of the perforated partition 30. The tube 88 or the like is snuggly received in hole 86 before the growing medium is added and extends above rim 48. After the growing medium is added and growing of plants commences, water for the plants is easily poured down tube 88 and into reservoir 82 when/as needed; and as often as desired without fear of over-watering since any excess water will drain out of water overflow opening 70. It will be noted that perforated partition 30 has no perforations immediately above and around overflow opening 70, and a cut-out 72 in skirt 76 which accommodates the height of indentation 68*a*.

Figure 10:
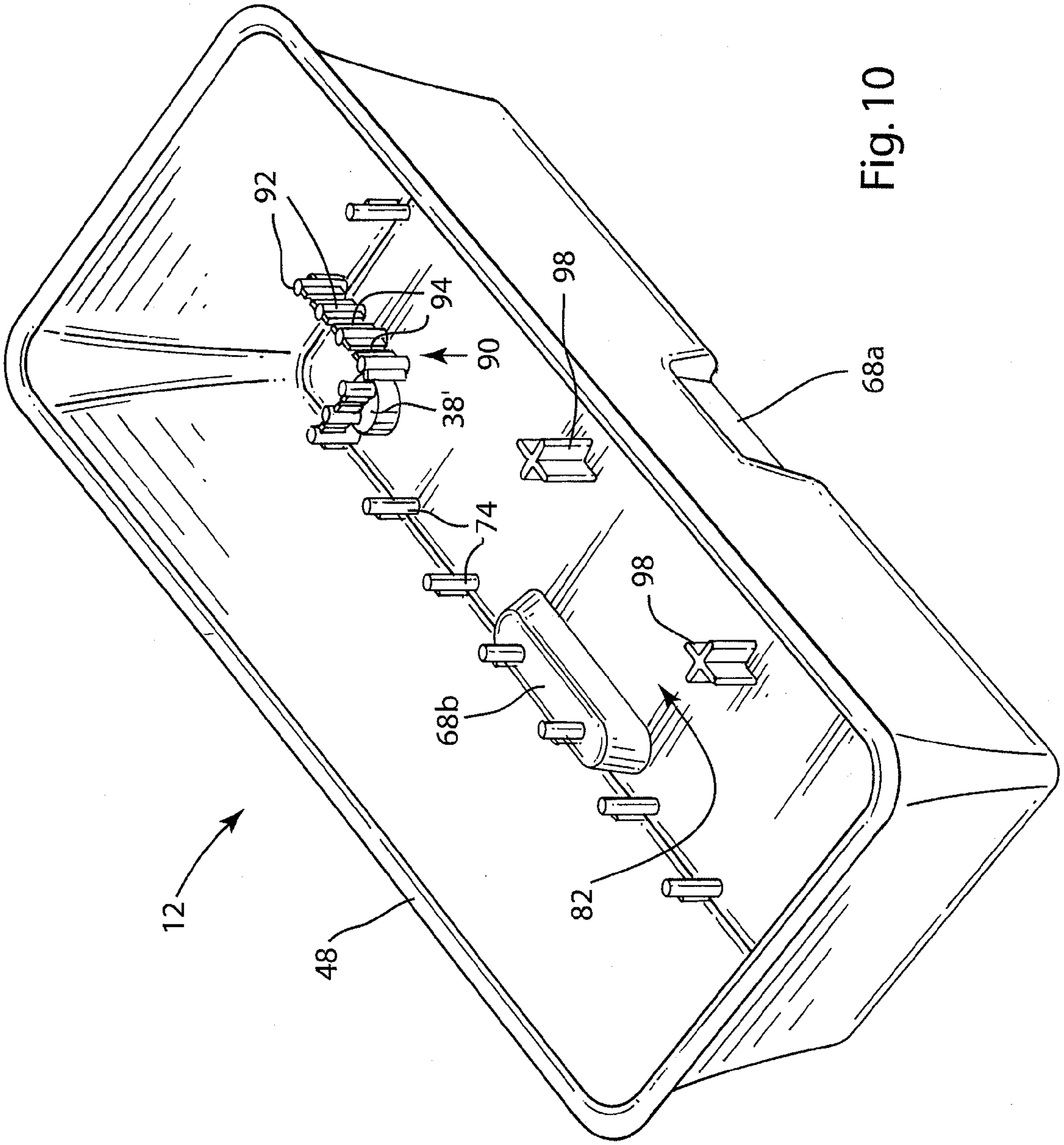
FIG. 10 is an isometric top, end and side view showing the interior of the growing container depicted in FIG. 3 and without the perforated partition.

Depicted in FIG. 10 is a perspective view of the bottom of container 12 showing a dam structure 90 provided below where the cut-out 32 of perforated partition 30 is located (at both ends). Dam structure 90 is formed of upstanding pillars 92 with vertical flanges 94 extending therefrom toward adjacent pillars 92; and at the location of cylinder 38', pillars 92 and flanges 94 are formed integrally therewith above cylinder 38'. The flanges 94 do not touch or meet, but instead provide a small vertical passage. In addition, it will be appreciated that skirt 76 is raised (does not extend as low) at the location of cut-out 32, while pillars 92 are shorter than holders 74. Thus, during use, water is easily transported over and around pillars 92 and flanges 94 into the growing medium deposited in cut-out 32 when reservoir 82 has water therein, but the coarser growing medium is largely dammed up behind dam structure 90 during use.

FIG. 10 also depicts upstanding supports 98 extending from the bottom of container 12. Supports 98 are located at the intersections of ribs 80, and extend up to the intersections. Supports 98 thus vertically support ribs 80 and hence perforated partition 30 at these locations to help prevent a downward bowing of perforated partition 30 during use.

It should be apparent that the improvements depicted provide for ease of manufacture and use of the disclosed growing apparatus 10. For example, the container 12 itself may be injection molded so as to integrally form the rim 48, the water overflow opening 70 and the openings or holes 38 for outrigger 14 or castors 42. Furthermore, it should be apparent that the perforated partition 30 may be injection molded to provide a strengthened horizontal base for supporting the growing medium, the fertilizer and the plants among other elements when the growing apparatus 10 is completely assembled and operational.

In addition, it should be apparent that the design of the container 12 itself is aesthetically pleasing and that the design of the rim clamp is more aesthetically pleasing than the flexible ties utilized in the prior art for tying vertical wooden stakes to the interior of prior Earthbox® containers.

While the present invention has been described with respect to exemplary embodiments thereof, it will be understood by those of ordinary skill in the art that variations and modifications can be effected within the scope and spirit of the invention.

We claim:

1. A growing apparatus in which a plant is grown comprising:

a container having a bottom and a surrounding wall member attached to said bottom;

a perforated partition located in said container above said bottom;

wherein said container further includes a plurality of holders extending upwardly from said bottom and attached to said surrounding wall, each said holder including a first portion which vertically engages said perforated partition to hold said partition a predetermined distance above said bottom, and a second portion which horizontally engages said perforated partition to hold said surrounding wall member adjacent said partition; and wherein said perforated partition further includes a planar base and a skirt depending from said base, where said skirt is engaged by said first portion and said second portion of said holder.

2. A growing apparatus as claimed in claim 1, wherein said perforated partition includes a series of reinforcing bosses extending between said skirt and said planar base, said reinforcing bosses strengthening said perforated partition vertically as well as horizontally.

3. A growing apparatus as claimed in claim 1, wherein said perforated partition includes a reinforcing rib extending between opposed sides of said skirt, said reinforcing rib strengthening said perforated partition vertically as well as horizontally.

4. A growing apparatus as claimed in claim 3:

wherein said perforated partition includes at least two of said reinforcing ribs which meet at an intersection; and wherein said container includes a support upstanding from said bottom which engages said reinforcing ribs at the intersection to vertically support said perforated partition at the intersection.

5. A growing apparatus as claimed in claim 1, wherein said bottom of said container includes a plurality of spaced pin receiving holes in which respective pins of respective caster wheels can be mounted such that the wheels extend exteriorly from said bottom.

6. A growing apparatus as claimed in claim 1, wherein said container includes a pair of opposing indentations located at intersections of said bottom and said surrounding wall, one of said indentations including an upper horizontal surface with an overflow opening provided therein.

7. A growing apparatus as claimed in claim 1:

wherein said partition includes a horizontal cut-out along a side thereof; and wherein said container includes a dam structure located below said cut-out which, together with said surrounding wall member, horizontally encloses said bottom of said container located below said cut-out, said dam structure including openings therein to permit water to flow through said dam structure.

8. A growing apparatus as claimed in claim 1:

wherein said planar base of said partition includes a horizontal cut-out at one corner; and wherein said container includes a dam structure located below said cut-out which, together with the adjacent said lateral and longitudinal walls, horizontally encloses said bottom of said container located below said cut-out, said dam structure including openings therein to permit water to flow horizontally through said dam structure.

9. A growing apparatus in which a plant is grown comprising:

a container having a bottom and a surrounding wall member attached to said bottom;

a perforated partition located in said container above said bottom;

wherein said container further includes a plurality of holders extending upwardly from said bottom and attached to said surrounding wall, each said holder including a first portion which vertically engages said perforated partition to hold said partition a predetermined distance above said bottom, and a second portion which horizontally engages said perforated partition to hold said surrounding wall member adjacent said partition;

wherein said perforated partition further includes a planar base and a skirt depending from said base, where said skirt is engaged by said first portion and said second portion of said holder; and wherein each said holder is formed as an upstanding member which is a) connected at a bottom end to said planar base of said bottom, b) connected at a side to the adjacent said surrounding wall member, and c) unconnected at a free end, such that a top of the upstanding member below said free end forms said first portion which vertically supports said skirt and a side of said free end forms said second portion which horizontally engages said skirt.

10. A growing apparatus as claimed in claim 9, wherein each said holder is integrally formed as an upstanding member which is a) connected at a bottom end to said planar base of said bottom, b) connected at a side to the adjacent said wall, and c) unconnected at a free end, such that a top of the upstanding member below said free end forms said first portion which vertically supports adjacent said lateral or longitudinal skirts and a side of said free end forms said second portion which horizontally engages adjacent said lateral or longitudinal skirts.

11. A growing apparatus as claimed in claim 10:

wherein said planar base of said partition includes a horizontal cut-out at one corner; and wherein said container includes a dam structure located below said cut-out which, together with the adjacent said lateral and longitudinal walls, horizontally encloses said bottom of said container located below said cut-out, said dam structure including openings therein to permit water to flow horizontally through said dam structure.

12. A growing apparatus as claimed in claim 11, wherein said container includes a pair of opposing indentations located at intersections of said bottom and said longitudinal walls, one of said indentations including an upper horizontal surface with an overflow opening provided therein.

13. A growing apparatus as claimed in claim 12, wherein said perforated partition includes a series of reinforcing bosses extending between said lateral and longitudinal skirts and said planar base, said reinforcing bosses strengthening said perforated partition vertically as well as horizontally, and a longitudinal rib extending between said lateral skirts and a lateral rib extending between said longitudinal skirts, said lateral and longitudinal ribs meeting at an intersection; and wherein said container includes a support upstanding from said bottom which engages said reinforcing ribs at the intersection to vertically support said perforated partition at the intersection.

14. A growing apparatus as claimed in claim 13, wherein said bottom of said container includes a plurality of spaced pin receiving holes in which respective pins of respective caster wheels can be mounted such that the wheels extend exteriorly from said bottom.

15. A growing apparatus in which a plant is grown comprising:

an integrally formed rectangular container having a bottom, two lateral walls upstanding from said bottom and two longitudinal walls upstanding from said bottom;

a generally rectangular partition located in said container above said bottom, said partition including a perforated planar base and two lateral skirts depending from said base and two longitudinal skirts depending from said base, respective said lateral skirts being located adjacent respective said lateral walls and respective said longitudinal skirts being located adjacent respective said longitudinal walls;

wherein said container further includes a plurality of holders extending upwardly from said bottom and integrally attached to said lateral and longitudinal walls, each said holder including a first portion which vertically engages a respective said lateral or longitudinal skirt of said perforated partition to hold said partition a predetermined distance above said bottom, and a second portion which horizontally engages a respective said lateral or longitudinal skirt of said perforated partition to hold respective said lateral and longitudinal walls adjacent said partition.

16. A growing apparatus as claimed in claim 15, wherein said perforated partition includes a series of reinforcing bosses extending between said lateral and longitudinal skirts and said planar base, said reinforcing bosses strengthening said perforated partition vertically as well as horizontally.

17. A growing apparatus as claimed in claim 15, wherein said perforated partition includes a reinforcing rib extending between opposed skirts, said reinforcing rib strengthening said perforated partition vertically as well as horizontally.

18. A growing apparatus as claimed in claim 17:

wherein said perforated partition includes at least two of said reinforcing ribs, a longitudinal rib extending between said lateral skirts and a lateral rib extending between said longitudinal skirts, said lateral and longitudinal ribs meeting at an intersection; and wherein said container includes a support upstanding from said bottom which engages said reinforcing ribs at the intersection to vertically support said perforated partition at the intersection.

19. A growing apparatus as claimed in claim 15, wherein said bottom of said container includes a plurality of spaced pin receiving holes in which respective pins of respective caster wheels can be mounted such that the wheels extend exteriorly from said bottom.

20. A growing apparatus as claimed in claim 15, wherein said container includes a pair of opposing indentations located at intersections of said bottom and said longitudinal walls, one of said indentations including an upper horizontal surface with an overflow opening provided therein.

* * * * *